US012801171B2

(12) United States Patent
Hung et al.

(10) Patent No.: US 12,801,171 B2
(45) Date of Patent: Nov. 17, 2026

(54) DIGITAL LOW DROPOUT REGULATOR AND ELECTRONIC DEVICE USING THE SAME

(71) Applicant: NUVOTON TECHNOLOGY CORPORATION, Hsinchu City (TW)

(72) Inventors: Yeh-Tai Hung, Zhubei City (TW); Chung Ming Hsieh, Zhubei City (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 202 days.

(21) Appl. No.: 18/524,449

(22) Filed: Nov. 30, 2023

(65) Prior Publication Data

US 2025/0036150 A1 Jan. 30, 2025

(30) Foreign Application Priority Data

Jul. 25, 2023 (TW) ................................ 112127738

(51) Int. Cl.
*G05F 1/575* (2006.01)

(52) U.S. Cl.
CPC .................................... *G05F 1/575* (2013.01)

(58) Field of Classification Search
CPC . G05F 1/575; G05F 1/56; G05F 1/562; G05F 1/563; G05F 1/565; G05F 1/569; G05F 1/571; G05F 1/573; G05F 1/5735; G05F 1/577; G05F 1/585; G05F 1/595
See application file for complete search history.

(56) References Cited

U.S. PATENT DOCUMENTS

2014/0070879 A1* 3/2014 Kawasaki ............... G06F 1/263
327/543
2018/0226981 A1* 8/2018 Salem ................. H03M 1/0617
2023/0288948 A1* 9/2023 Lee ......................... G05F 1/563

* cited by examiner

*Primary Examiner* — Nguyen Tran
(74) *Attorney, Agent, or Firm* — MUNCY, GEISSLER, OLDS & LOWE, P.C.

(57) ABSTRACT

The present disclosure provides a digital low-dropout regulator (DLDO) and an electronic device using the same. The DLDO includes a voltage comparator circuit, a switch control circuit, a power switch module, and an asynchronous clock generation circuit. The voltage comparator circuit compares a reference voltage with the output voltage to output a comparison result signal. The switch control circuit generates a switch control signal based on the comparison result signal. The power switch module is controlled by the switch control signal to switch between the on state and the off state, thereby adjusting the output voltage. The asynchronous clock generation circuit generates a reference clock signal that is asynchronous with the system clock signal used in the load circuit and has a higher clock frequency. This allows the switch control circuit to update the switch control signal based on the reference clock signal.

16 Claims, 3 Drawing Sheets

DIGITAL LOW DROPOUT REGULATOR AND ELECTRONIC DEVICE USING THE SAME

CROSS-REFERENCE TO RELATED APPLICATION

This application claims the priority from the TW patent application No. 112127738, filed on Jul. 25, 2023, and all contents of such TW Patent Application are included in the present disclosure.

BACKGROUND

1. Field of the Invention

The present disclosure is related to regulator circuit technology, in particular to, a digital low-dropout regulator (DLDO) and an electronic device using the same.

2. Description of the Related Art

Different electronic devices have different supply voltage requirements, so the conversion of supply voltage has always been an important research area. The voltage conversion may generally be divided into two manners: switching regulators and linear regulators. The linear regulators have their advantages, such as rapid response to input voltage or changes in load, low ripple and noise of output voltage, simple circuit structure, small size, and relatively lower cost. Digital low-dropout linear regulators (DLDOs) have become the primary choice for low-power buck and regulator circuits due to their characteristics of improved conversion efficiency, small size, and low noise.

In the traditional design of digital low-dropout regulator circuit, the voltage regulation speed is mainly determined by the system clock. However, the system clock speed generally cannot be set too high in consideration of the power consumption of the overall device. Thus, the voltage regulation speed of the traditional digital low-dropout regulator is limited by the system clock speed and thus difficult to increase.

SUMMARY

The present disclosure presents a digital low-dropout regulator and an electronic device using the same, which may rapidly respond to changes in load current to regulate the output voltage, so that the output voltage may settle at a reference voltage at any time.

Embodiments of the present disclosure provide a digital low-dropout regulator (DLDO) adapted for regulating an output voltage provided to a load circuit. The DLDO comprises a voltage comparator circuit configured for comparing a reference voltage with the output voltage to output a comparison result signal; a switch control circuit coupled to the voltage comparator circuit and configured for generating a switch control signal based on the comparison result signal; a power switch module configured to be controlled by the switch control signal to switch between an on state and an off state, thereby adjusting the output voltage; and an asynchronous clock generation circuit coupled to the switch control circuit and the voltage comparator circuit, and configured for generating a reference clock signal that is asynchronous with a system clock signal, wherein the system clock signal is used in the load circuit. The switch control circuit updates the output switch control signal based on the reference clock signal, to make the output voltage approach the reference voltage. A clock frequency of the reference clock signal is higher than a clock frequency of the system clock signal.

Embodiments of the present disclosure further provide an electronic device. The electronic device comprises a load circuit configured for performing a load function based on an output voltage and a system clock signal; and a digital low-dropout regulator (DLDO) coupled to the load circuit and configured for adjusting the output voltage provided to the load circuit based on a reference clock signal, to make the output voltage approach a reference voltage. The reference clock signal is triggered when a level change in the system clock signal occurs, and a clock frequency of the reference clock signal is higher than a clock frequency of the system clock signal.

Based on the above, by providing the higher reference clock signal relative to a clock frequency of the system clock signal as the reference timing used in the digital low-dropout regulator for performing regulation, the digital low-dropout regulator and the electronic device using the same presented in the present disclosure may regulate the output voltage more rapidly, so that the output voltage may stably maintain close to the reference voltage. Additionally, since the triggering time, the clock frequency, and the pulse number of the reference clock signal in the disclosed embodiments are programmable, rapid voltage regulation may only be performed during/within the time intervals in which the output voltage may change significantly, without the necessity of continuously sending high-frequency pulses throughout the entire duration. Thus, the present disclosure can not only take into account the power consumption performance of the electronic device, but can also enhance the stability of the overall power supply.

BRIEF DESCRIPTION OF THE DRAWINGS

The drawings are provided to make the persons with ordinary knowledge in the field of the art further understand the present disclosure, and are incorporated into and constitute a part of the specification of the present disclosure. The drawings illustrate demonstrated embodiments of the present disclosure, and are used to explain the principal of the present disclosure together with the description of the present disclosure.

DESCRIPTION OF THE PREFERRED EMBODIMENTS

Figure 1:
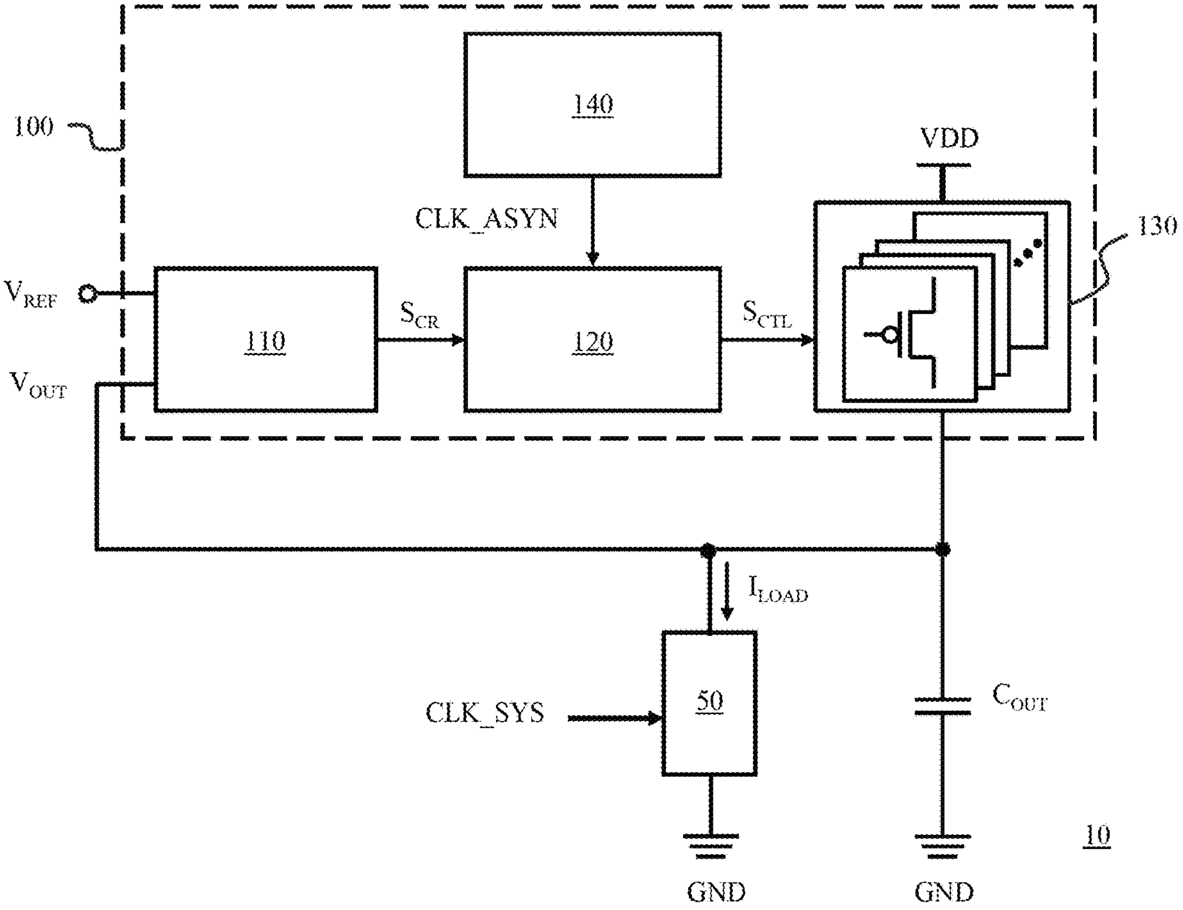
FIG. 1 is a schematic functional block diagram illustrating an electronic device and its digital low-dropout regulator according to an embodiment of the present disclosure.

The present disclosure presents a novel digital low-dropout regulator and an electronic device using the same to address the issues mentioned in the prior art. In order to make the features and advantages of the present disclosure more obvious and comprehensible, preferred embodiments accompanied with drawings are described in detail below. The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

FIG. 1 is a functional block diagram illustrating an electronic device and its digital low-dropout regulator according to an embodiment of the present disclosure. Referring to FIG. 1, the electronic device 10 in this embodiment may be a digital circuit such as a microcontroller (MCU), digital signal processor (DSP), or field programmable gate array (FPGA), but the present disclosure is not limited thereto. The electronic device 10 comprises a load circuit 50 and a digital low-dropout regulator 100.

The load circuit 50 receives an output voltage $V_{OUT}$ from its power terminal and performs load functions based on the output voltage $V_{OUT}$ and a system clock signal CLK_SYS. The load circuit 50 may be, for example, a transmission module, access controller, memory module, power management module, sensor, or peripheral input/output equipment, but the present disclosure is not limited thereto. The digital low-dropout regulator 100 is coupled to the power terminal of the load circuit 50 and regulates the output voltage $V_{OUT}$ provided to the load circuit 50, to make the output voltage $V_{OUT}$ approach a set reference voltage $V_{REF}$.

The digital low-dropout regulator 100 controls the turning-on/cutting-off of multiple power switches based on the relation between the current output voltage $V_{OUT}$ and the reference voltage $V_{REF}$, thereby regulating the output voltage $V_{OUT}$ provided to the load circuit 50 by controlling charging and discharging of an output capacitor $C_{OUT}$.

In this embodiment, the digital low-dropout regulator 100 uses a reference clock signal CLK_ASYN that is asynchronous with the system clock signal CLK_SYS as a reference timing for voltage regulation. In other words, the voltage regulation speed of the digital low-dropout regulator 100 is determined based on a clock frequency of the reference clock signal CLK_ASYN, where the clock frequency of the reference clock signal CLK_ASYN is higher than a clock frequency of the system clock signal CLK_SYS. Thus, compared with digital low-dropout regulators performing voltage regulation using the system clock signal CLK_SYS, the digital low-dropout regulator 100 in this embodiment may regulate the output voltage $V_{OUT}$ more rapidly to approach the reference voltage $V_{REF}$.

Specifically, the digital low-dropout regulator 100 includes a voltage comparator circuit 110, a switch control circuit 120, a power switch module 130, and an asynchronous clock generation circuit 140. An input terminal of the voltage comparator circuit 110 is coupled to the power terminal of the load circuit 50 to receive the output voltage $V_{OUT}$. The voltage comparator circuit 110 compares the reference voltage $V_{REF}$ with the output voltage $V_{OUT}$ to output a comparison result signal $S_{CR}$.

The switch control circuit 120 is coupled to the voltage comparator circuit 110 and generates a switch control signal $S_{CTL}$ based on the comparison result signal $S_{CR}$. The switch control circuit 120 updates, based on the comparison result signal $S_{CR}$, the switch control signal $S_{CTL}$ within each cycle of the reference clock signal CLK_ASYN. In this embodiment, the switch control signal $S_{CTL}$ may be a multi-bit signal. The number of bits of the switch control signal $S_{CTL}$ corresponds to the number of power switches included in the power switch module 130.

The power switch module 130 is coupled to an output terminal of the switch control circuit 120 to receive the switch control signal $S_{CTL}$ and is controlled by the switch control signal $S_{CTL}$ to switch between an on state and an off state, thereby adjusting the output voltage $V_{OUT}$. In this embodiment, the power switch module 130 may include multiple power switches connected in parallel. The multiple power switches are connected in series between a power supply voltage VDD and the output capacitor $C_{OUT}$. The control terminals of the multiple power switches may respectively receive corresponding signals in the switch control signal $S_{CTL}$.

For example, if the power switch module 130 includes four power switches, the switch control signal $S_{CTL}$ may be a 4-bit signal. The four power switches may respectively receive the first bit to the fourth bit of the switch control signal $S_{CTL}$ to determine turning-on or cutting-off. For instance, if the switch control signal $S_{CTL}$ is a signal expressed as (1, 0, 0, 0), where "1" may represent an enabling signal enabling turning-on of a power switch and "0" may represent a disabling signal enabling cutting-off of the power switch. Thus, when the power switch module 130 receives the switch control signal $S_{CTL}$ expressed as (1, 0, 0, 0), the power switch receiving the enabling signal is turned-on, while the other power switches receiving the disabling signals are cut-off.

The asynchronous clock generation circuit 140 is coupled to the switch control circuit 120 and the voltage comparator circuit 110. The asynchronous clock generation circuit 140 generates the reference clock signal CLK_ASYN. The reference clock signal CLK_ASYN is asynchronous with the system clock signal CLK_SYS used in the load circuit 50 and has a higher clock frequency than that of the system clock signal CLK_SYS.

In this embodiment, the switch control circuit 120 updates the generated switch control signal $S_{CTL}$ based on the reference clock signal CLK_ASYN with the higher clock frequency. Thus, the digital low-dropout regulator 100 may regulate the output voltage $V_{OUT}$ more rapidly, so that the output voltage $V_{OUT}$ may stably maintain close to the reference voltage $V_{REF}$.

Besides, the load circuit 50 generally triggers its load function in response to the rising edge/falling edge of the system clock signal CLK_SYS. Thus, when the level of the system clock signal CLK_SYS changes, there is generally a larger change in load current $I_{LOAD}$, leading to instability of the output voltage $V_{OUT}$.

In some embodiments, to better maintain the stability of the power supply, the asynchronous clock generation circuit 140 may also be designed to generate the reference clock signal CLK_ASYN based on the level change in the system clock signal CLK_SYS. This allows the digital low-dropout regulator 100 to perform rapid voltage regulation the voltage during the rising edge/falling edge of the system clock signal CLK_SYS, so as to rapidly regulate and settle the output voltage $V_{OUT}$, based on the reference clock signal CLK_ASYN with the higher clock frequency, during the periods in which the output voltage $V_{OUT}$ may fluctuate.

In other words, the asynchronous clock generation circuit 140 in this embodiment may generate a predetermined number of pulses only within a triggering period in which the rising edge and/or falling edge of the system clock signal CLK_SYS occurs. The predetermined number of pulses are generated as a reference timing for the switch control circuit 120 to generate the switch control signal $S_{CTL}$. The length of the triggering period and the predetermined number may be selected based on the circuit design of the asynchronous clock generation circuit 140.

As a result, the digital low-dropout regulator 100 may only perform rapid voltage regulation during the time intervals in which the output voltage may change significantly, without the necessity of continuously sending high-frequency pulses throughout the entire duration. Thus, it can not only take into account the power consumption performance of the electronic device, but can also enhance the stability of the overall power supply.

The above-described digital low-dropout regulator 100 and the electronic device using the same are described specifically as follows with reference to different embodiments of FIGS. 2A to 3B.

Figure 2A:
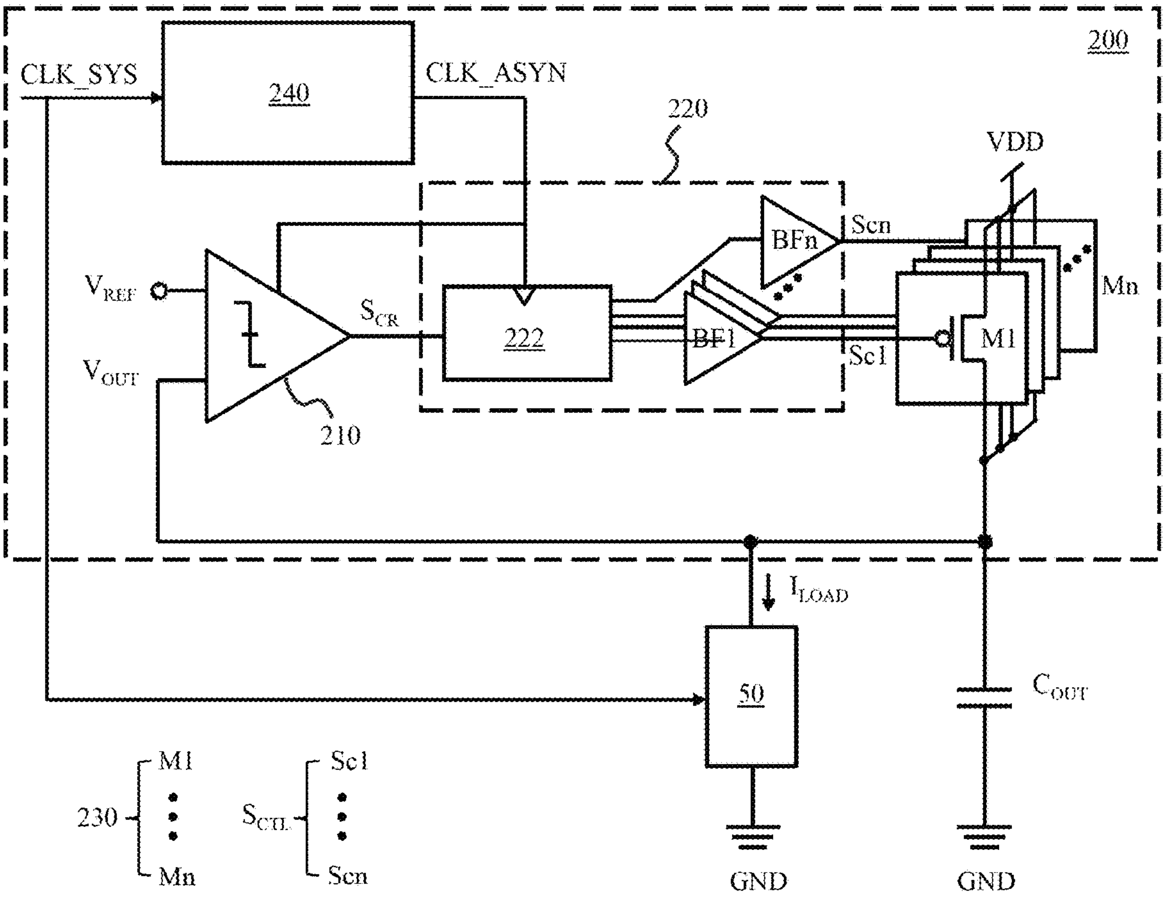
FIG. 2A is a schematic circuit diagram of a digital low-dropout regulator according to an embodiment of the present disclosure.
Figure 2B:
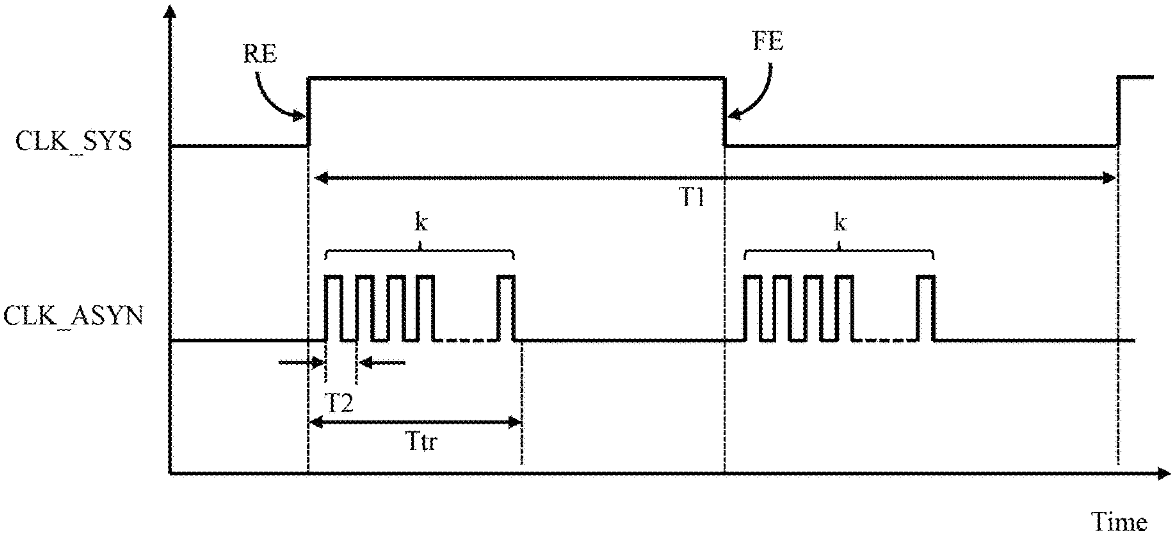
FIG. 2B is a schematic timing diagram of the digital low-dropout regulator of FIG. 2A.

Referring to FIG. 2A and FIG. 2B, FIG. 2A is a schematic circuit diagram of a digital low-dropout regulator according to an embodiment of the present disclosure, and FIG. 2B is a schematic timing diagram of the digital low-dropout regulator of FIG. 2A. The digital low-dropout regulator 200 in this embodiment regulates the output voltage $V_{OUT}$ provided to the load circuit 50. The digital low-dropout regulator 200 includes a voltage comparator circuit 210, a switch control circuit 220, a power switch module 230, and an asynchronous clock generation circuit 240.

The voltage comparator circuit 210 in this embodiment may be implemented, for example, with an error amplifier (hereinafter described by "error amplifier 210"), but the present disclosure is not limited thereto. The error amplifier 210 compares the voltages received from its two input terminals (i.e., the output voltage $V_{OUT}$ and the reference voltage $V_{REF}$) and outputs a comparison result signal $S_{CR}$ based on the comparison result. The error amplifier 210 may determine the time instant for comparing the output voltage $V_{OUT}$ with the reference voltage $V_{REF}$ based on the reference clock signal CLK_ASYN. For example, when the output voltage $V_{OUT}$ is greater than the reference voltage $V_{REF}$, the error amplifier 210 may output a disabling comparison result signal $S_{CR}$ (e.g., a low level). Conversely, when the output voltage $V_{OUT}$ is less than the reference voltage $V_{REF}$, the error amplifier 210 outputs an enabling comparison result signal $S_{CR}$.

The switch control circuit 220 in this embodiment includes, for example, a bidirectional shift register 222 and multiple buffers BF1-BFn. The bidirectional shift register 222 generates a multi-bit signal based on the comparison result signal $S_{CR}$ and updates the multi-bit signal based on the clock frequency of the reference clock signal CLK_ASYN. The buffers BF1-BFn are coupled to the output terminal of the bidirectional shift register 222 to respectively receive each bit signal of the multi-bit signal. The buffers BF1-BFn adjust each bit signal to the control signals Sc1-Sen available for driving the power switches M1-Mn at the backend.

The power switch module 230 in this embodiment includes, for example, n power switches M1-Mn, where n is a positive integer greater than 1. Each of the power switches M1-Mn has a first terminal, a second terminal, and a control terminal. The first terminal of each of the power switches M1-Mn receives the power supply voltage VDD. The second terminal of each of the power switches M1-Mn is coupled to the load circuit 50 and the output capacitor $C_{OUT}$. The control terminals of the power switches M1-Mn are respectively coupled to the output terminals of the buffers BF1-BFn to receive corresponding control signals Sc1-Scn. The (control terminals of the) power switches M1-Mn turn-on or cut-off in response to the received control signals Sc1-Scn.

The asynchronous clock generation circuit 240 in this embodiment triggers the generation of a pulse group consisting of k pulses as the reference clock signal CLK_ASYN during the rising edge RE and falling edge FE of the system clock signal CLK_SYS. The pulse group occurs within a triggering period Ttr and has a pulse cycle T2 smaller than the completion time of the system clock signal CLK_SYS. In other words, when the system clock signal CLK_SYS triggers the asynchronous clock generation circuit 240 to generate the reference clock signal CLK_ASYN, the asynchronous clock generation circuit 240 generates, within the triggering period Ttr, the pulse group as the clock frequency of the reference clock signal CLK_SYS. The clock frequency of the reference clock signal CLK_ASYN is higher than that of the system clock signal CLK_SYS. In this embodiment, the pulse cycle T1 may, for example, be greater than 10 ns. The pulse cycle T2 may, for example, be less than or equal to 10 ns, such as ranging from 2 ns to 10 ns, but the present disclosure is not limited thereto.

From the perspective of the overall operation of the digital low-dropout voltage regulator 200, when the level of the system clock signal CLK_SYS changes, the asynchronous clock generation circuit 240 triggers the generation of k pulses, so that the error amplifier 210 and the bidirectional shift register 222 operate with reference to the k pulses.

During the period when the error amplifier 210 and the bidirectional shift register 222 operate with reference to these k pulses, the error amplifier 210 outputs the disabling comparison result signal $S_{CR}$ when the output voltage $V_{OUT}$ is greater than the reference voltage $V_{REF}$. This allows the bidirectional shift register 222 to output the corresponding byte signals based on the disabling comparison result signal $S_{CR}$. The buffers BF1-BFn generate the corresponding control signals Sc1-Sen after receiving the byte signals, so that one of the power switches M1~Mn that were originally turned-on is turned-off, thereby making the output voltage $V_{OUT}$ fall.

In another aspect, the error amplifier 210 outputs the enabling comparison result signal $S_{CR}$ when the output voltage $V_{OUT}$ is smaller than the reference voltage $V_{REF}$. This allows the bidirectional shift register 222 to output the corresponding byte signals based on the enabling comparison result signal $S_{CR}$. The buffers BF1-BFn generate the corresponding control signals Sc1-Sen after receiving the byte signals, so that one of the power switches M1~Mn that were originally turned-off is turned-on, thereby making the output voltage $V_{OUT}$ rise.

By repeating the above operations during each cycle of the reference clock signal CLK_ASYN, the digital low-dropout regulator 200 may step by step adjust the output voltage $V_{OUT}$, to make the output voltage $V_{OUT}$ gradually approach the reference voltage $V_{REF}$. In this embodiment, the pulses number k of the pulse group, the pulse cycle T2, and the triggering period Ttr may be adjusted and set. In other words, designers may adjust the circuit design of the asynchronous clock generation circuit 240 based on the actual voltage regulation requirements of the electronic device, ensuring that the reference clock signal CLK_ASYN conforms to the set format, thereby allowing the digital low-dropout regulator 200 to perform voltage regulation according to the required timing.

In some embodiments, if the rising edge RE or the falling edge FE of the system clock signal CLK_SYS occurs within the triggering period Ttr when generating the pulse group, the asynchronous clock generation circuit 240 may reset the reference clock signal CLK_ASYN. This allows the asynchronous clock generation circuit 240 to resend k pulses for performing the voltage regulation, where the triggering period Ttr is also restarted at the same time.

Figure 3A:
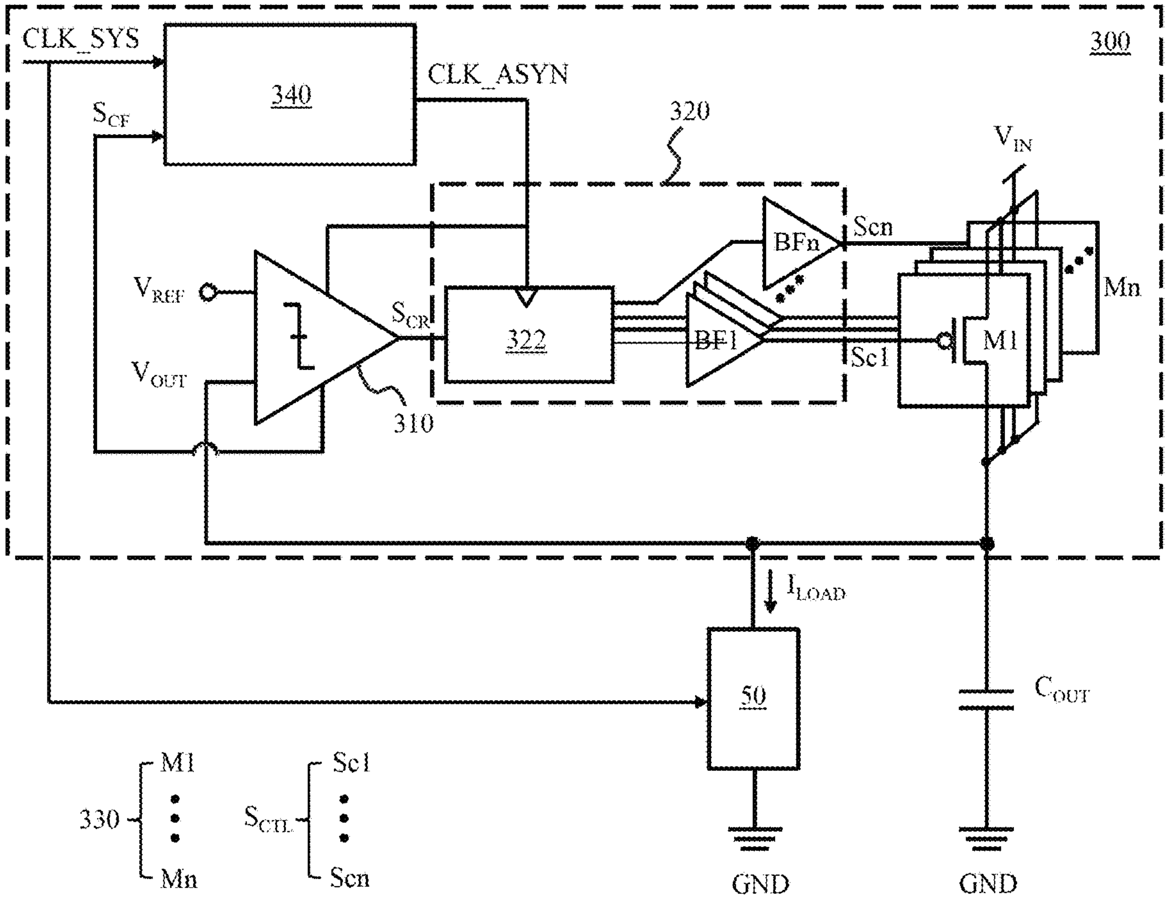
FIG. 3A is a schematic circuit diagram of a digital low-dropout regulator according to another embodiment of the present disclosure.
Figure 3B:
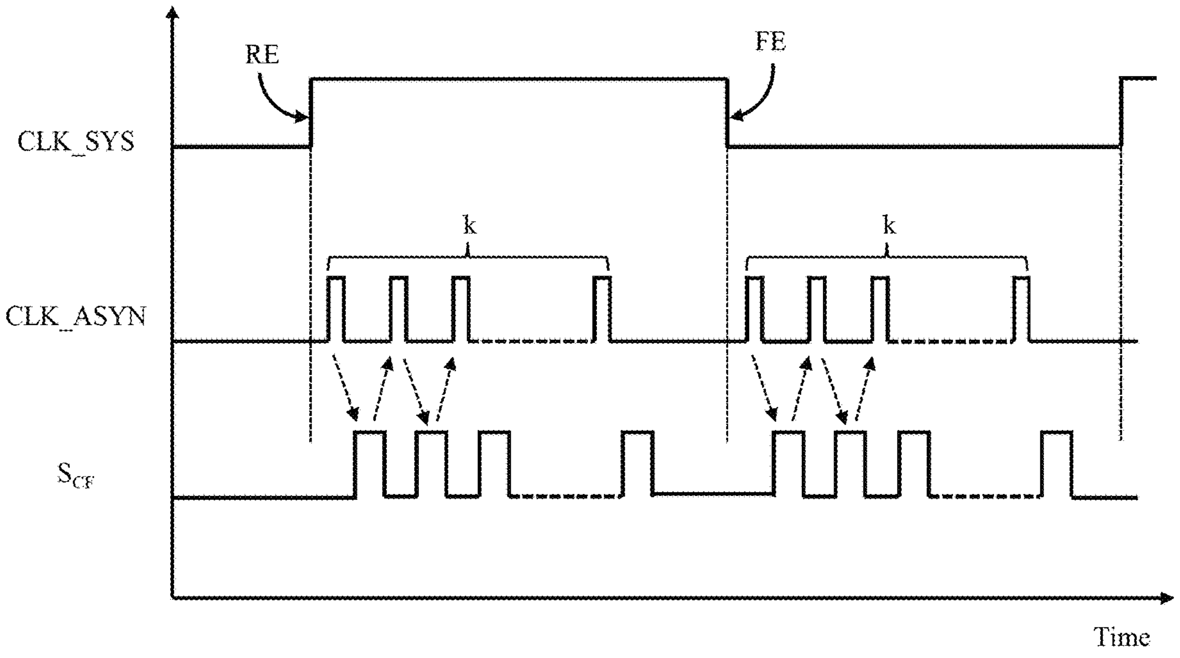
FIG. 3B is a schematic timing diagram of the digital low-dropout regulator of FIG. 3A.

Referring to FIG. 3A and FIG. 3B, FIG. 3A is a schematic circuit diagram of a digital low-dropout regulator according to another embodiment of the present disclosure, and FIG. 3B is a schematic timing diagram of the digital low-dropout regulator of FIG. 3A.

In this embodiment, the digital low-dropout regulator 300 includes a voltage comparator circuit 310, a switch control circuit 320, a power switch module 330, and an asynchronous clock generation circuit 340. Since the configuration and operation of the switch control circuit 320, the power switch module 330, and the asynchronous clock generation circuit 340 are similar to the switch control circuit 220, the power switch module 230, and the asynchronous clock generation circuit 240 described in FIG. 2A, relevant descriptions can be referred to the explanation of the embodiments described above, and are not repeatedly described herein.

The difference between this embodiment and FIG. 2A and FIG. 2B embodiments includes that the voltage comparator circuit 310 in this embodiment outputs a comparison completion signal $S_{CF}$ to the asynchronous clock generation circuit 340. The asynchronous clock generation circuit 340 may determine the clock frequency of the reference clock signal CLK_ASYN based on the comparison completion signal $S_{CF}$.

For example, the voltage comparator circuit 310 may output an enabling comparison completion signal $S_{CF}$ (e.g., a pulse) after completing the comparison. In another aspect, the asynchronous clock generation circuit 340 maintains the reference clock signal CLK_ASYN at a low level after sending the pulse. When the asynchronous clock generation circuit 340 receives the enabling comparison completion signal $S_{CF}$, it triggers the generation of the next pulse.

In other words, in this embodiment, the asynchronous clock generation circuit 340 not only determines the time instant for generating the pulse group based on changes in the level of the system clock signal CLK_SYS, but also determines the time interval between two adjacent pulses of the pulse group based on the received enabling comparison completion signal $S_{CF}$.

To sum up, by providing the higher reference clock signal relative to a clock frequency of the system clock signal as the reference timing for the digital low-dropout regulator performing regulation, the digital low-dropout regulator and the electronic device using the same presented in the present disclosure may regulate the output voltage more rapidly, so that the output voltage may stably maintain close to the reference voltage. Additionally, since the triggering time, the clock frequency, and the pulse number of the reference clock signal in the disclosed embodiments are programmable, rapid voltage regulation may only be performed during/within the time intervals in which the output voltage may change significantly, without the necessity of continuously sending high-frequency pulses throughout the entire duration. Thus, the present disclosure can not only take into account the power consumption performance of the electronic device, but can also enhance the stability of the overall power supply.

It should be understood that the examples and the embodiments described herein are for illustrative purpose only, and various modifications or changes in view of them will be suggested to those skilled in the art, and will be included in the spirit and scope of the application and the appendix with the scope of the claims.

What is claimed is:

1. A digital low-dropout regulator (DLDO) adapted for regulating an output voltage provided to a load circuit, comprising:

a voltage comparator circuit configured for comparing a reference voltage with the output voltage to output a comparison result signal;

a switch control circuit coupled to the voltage comparator circuit and configured for generating a switch control signal based on the comparison result signal;

a power switch module configured to be controlled by the switch control signal to switch between an on state and an off state, thereby adjusting the output voltage; and an asynchronous clock generation circuit coupled to the switch control circuit and the voltage comparator circuit, and configured for generating a reference clock signal that is asynchronous with a system clock signal, wherein the system clock signal is used in the load circuit, wherein the switch control circuit updates the output switch control signal based on the reference clock signal, to make the output voltage approach the reference voltage, wherein a clock frequency of the reference clock signal is higher than a clock frequency of the system clock signal, wherein when the system clock signal triggers the asynchronous clock generation circuit to generate the reference clock signal, the asynchronous clock generation circuit generates, within a triggering period, a pulse group as the reference clock signal wherein when a level change in the system clock signal occurs within the triggering period, the asynchronous clock generation circuit resets the reference clock signal to restart the triggering period.

2. The DLDO according to claim 1, wherein the asynchronous clock generation circuit triggers the generation of the reference clock signal in response to at least one of a rising edge and a falling edge of the system clock signal.

3. The electronic device according to claim 1, wherein the asynchronous clock generation circuit determines a time instant for generating the pulse group based on the system clock signal and determines a time interval of each pulse of the pulse group based on a comparison completion signal.

4. The electronic device according to claim 1, wherein a length of the triggering period and a predetermined number of pulses are selected according to the asynchronous clock generation circuit.

5. The DLDO according to claim 1, wherein the voltage comparator circuit determines a time instant for comparing the output voltage with the reference voltage based on the reference clock signal, and the voltage comparator circuit outputs a comparison completion signal to the asynchronous clock generation circuit.

6. The electronic device according to claim 1, wherein a number of bits of the switch control signal corresponds to a number of power switches comprised in the power switch module.

7. The electronic device according to claim 1, wherein the asynchronous clock generation circuit determines the clock frequency of the reference clock signal based on a comparison completion signal.

8. An electronic device, comprising:

a load circuit configured for performing a load function based on an output voltage and a system clock signal; and a digital low-dropout regulator (DLDO) coupled to the load circuit and configured for regulating the output voltage provided to the load circuit based on a reference clock signal, to make the output voltage approach a reference voltage, wherein the reference clock signal is triggered when a level change in the system clock signal occurs, and a clock frequency of the reference clock signal is higher than a clock frequency of the system clock signal, wherein a number of bits of the switch control signal corresponds to a number of power switches comprised in the power switch module, wherein the voltage comparator circuit determines a time instant for comparing the output voltage with the reference voltage based on the reference clock signal, and the voltage comparator circuit outputs a comparison completion signal to the asynchronous clock generation circuit.

9. The electronic device according to claim 8, wherein the DLDO comprises:

a voltage comparator circuit, configured for comparing the reference voltage with the output voltage to output a comparison result signal;

a switch control circuit, coupled to the voltage comparator circuit and configured for generating a switch control signal based on the comparison result signal;

a power switch module, configured to be controlled by the switch control signal to switch between an on state and an off state, thereby adjusting the output voltage; and an asynchronous clock generation circuit, coupled to the switch control circuit and the voltage comparator circuit, and configured for generating the reference clock signal based on a level change in the system clock signal.

10. The electronic device according to claim 9, wherein the switch control circuit updates the output switch control signal based on the reference clock signal.

11. The electronic device according to claim 8, wherein the asynchronous clock generation circuit triggers the asynchronous clock generation circuit to generate, within a triggering period, a pulse group as the reference clock signal in response to at least one of a rising edge and a falling edge of the system clock signal.

12. The electronic device according to claim 11, wherein when the level change in the system clock signal occurs within the triggering period, the asynchronous clock generation circuit resets the reference clock signal to restart the triggering period.

13. The electronic device according to claim 11, wherein a length of the triggering period and a predetermined number of pulses are selected according to the asynchronous clock generation circuit.

14. The electronic device according to claim 11, wherein the asynchronous clock generation circuit determines a time instant for generating the pulse group based on the system clock signal and determines a time interval of each pulse of the pulse group based on the comparison completion signal.

15. The electronic device according to claim 8, wherein the reference clock signal is asynchronous with the system clock signal.

16. The electronic device according to claim 8, wherein the asynchronous clock generation circuit determines the clock frequency of the reference clock signal based on a comparison completion signal.

* * * * *